Figure 1:
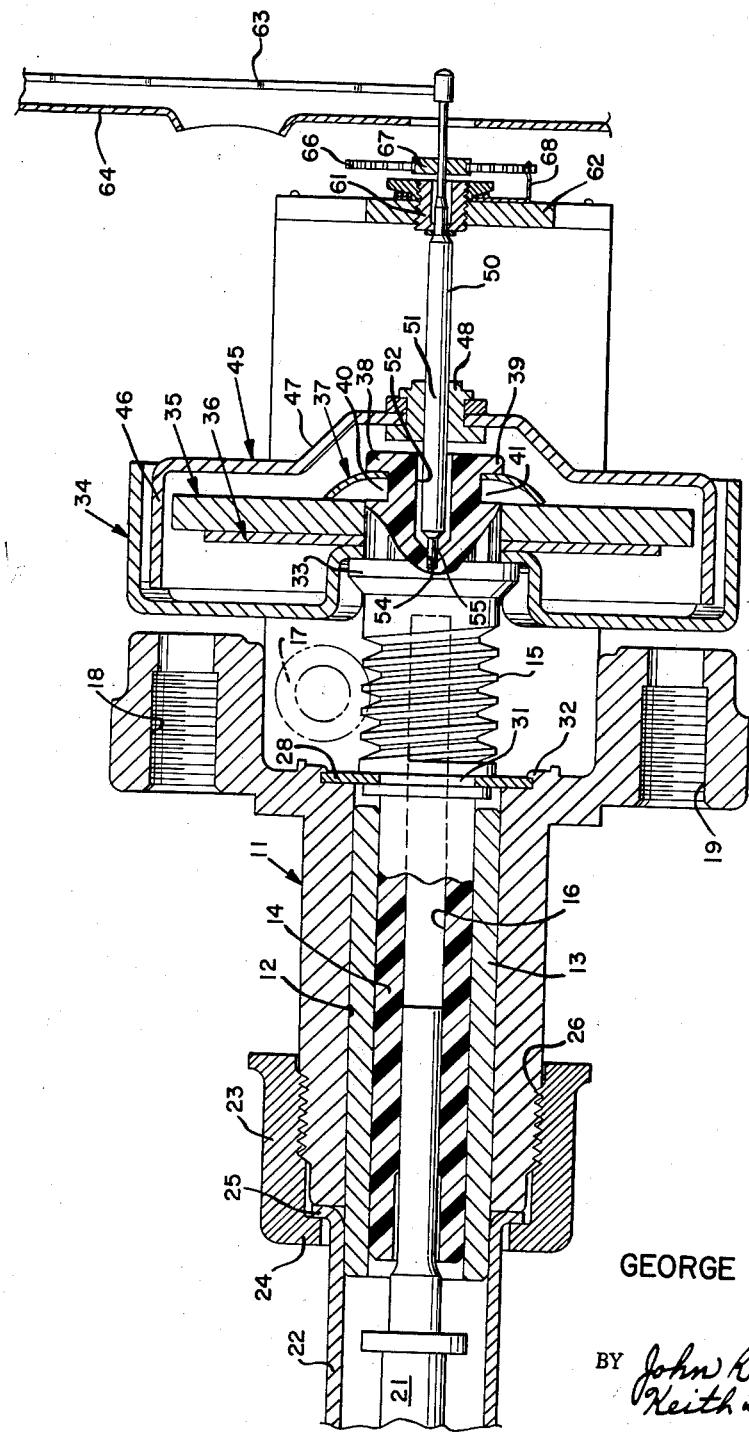

Nov. 19, 1963

G. C. WALLIS, JR 3,111,037

SPEEDOMETER

Filed July 3, 1961

3 Sheets-Sheet 1

GEORGE C. WALLIS, JR.
INVENTOR.

BY John R. Faulkner
Keith L. Zerschling
ATTORNEYS

Nov. 19, 1963    G. C. WALLIS, JR    3,111,037
SPEEDOMETER
Filed July 3, 1961    3 Sheets-Sheet 2

GEORGE C. WALLIS, JR.
INVENTOR.

BY John B. Faulkner
Keith L. Zerschling
ATTORNEYS

Nov. 19, 1963     G. C. WALLIS, JR     3,111,037
SPEEDOMETER
Filed July 3, 1961     3 Sheets-Sheet 3

GEORGE C. WALLIS, JR.
INVENTOR.

BY *John R. Faulkner*
*Keith L. Zerschling*
ATTORNEYS

United States Patent Office 3,111,037
Patented Nov. 19, 1963

3,111,037
SPEEDOMETER
George C. Wallis, Jr., Livonia, Mich., assignor to Ford Motor Company, Dearborn, Mich., a corporation of Delaware
Filed July 3, 1961, Ser. No. 121,542
5 Claims. (Cl. 73—519)

This invention relates to a speedometer for an automotive vehicle and more particularly to a speedometer for an automotive vehicle incorporating novel structural combinations that significantly reduce the cost of the speedometer.

In conventional automotive vehicle speedometers, a metallic speedometer shaft is supported in a speedometer housing and is connected to a rotatable portion of the vehicle, preferably a rotating portion of the transmission, by means of a flexible cable. This shaft supports a permanent magnet constructed of bar stock that is conventionally staked to the shaft. It also has a bore positioned in one end thereof for receiving a jewel type bearing. The shaft of an eddy current speed cup is rotatably journaled within the jeweled bearing for relative rotation with respect to the speedometer shaft. The shaft of the eddy current cup carries a pointer at one end which is positioned before a speedometer scale, and a hair spring biases the pointer to the zero end of the scale. When the metallic speedometer shaft positioned within the speedometer housing is rotated by means of the flexible cable, it rotates the permanent magnet relative to the eddy current speed cup. The relative rotation of the magnet with respect to the speed cup causes a rotation of the speed cup against the bias of the hair spring by an amount proportional to the speed of rotation of the magnet. This moves the pointer relative to the scale to provide the operator of the motor vehicle with an indication of the speed of the vehicle.

The present invention provides structural improvements over the conventional speedometer structure described above. One of these structural improvements is the provision of a novel fastening means for affixing the permanent magnet to the rotatable shaft of the speedometer. This means takes the form of a spring washer which engages the shaft and the magnet, and it is particularly useful when a powdered metal magnet is employed with the speedometer. Another of the structural improvements is the elimination of the jewel bearings in which the eddy current cup shaft is journaled. In the present invention a shaft having self-lubricating properties is employed and this shaft is preferably constructed of nylon that may be impregnated with a sulfide of molybdenum.

As was previously stated, the spring washer fastening means is particularly advantageous when powdered metal permanent magnets are employed. In fact, from a practical standpoint, this fastening means permits the use of powdered metal permanent magnets as they are quite brittle and cannot be staked to the shaft. In mass production these powdered metal permanent magnets are a few cents cheaper than the permanent magnets constructed from bar stock, hence the present invention provides a significant cost advantage over conventional speedometers when powdered metal permanent magnets are employed. The elimination of the jewel bearings in the speedometer shaft also results in substantial cost savings. These cost savings are very important in high production items, such as speedometers, where several million are constructed every year.

An object of the present invention is the provision of an automotive vehicle speedometer that is less expensive and less complicated than conventional speedometers.

Another object of the invention is the provision of an automotive speedometer that has fewer parts than conventional speedometers.

A further object of the invention is to provide a novel fastening means for affixing a magnet to the end of a speedometer shaft.

Figure 2:
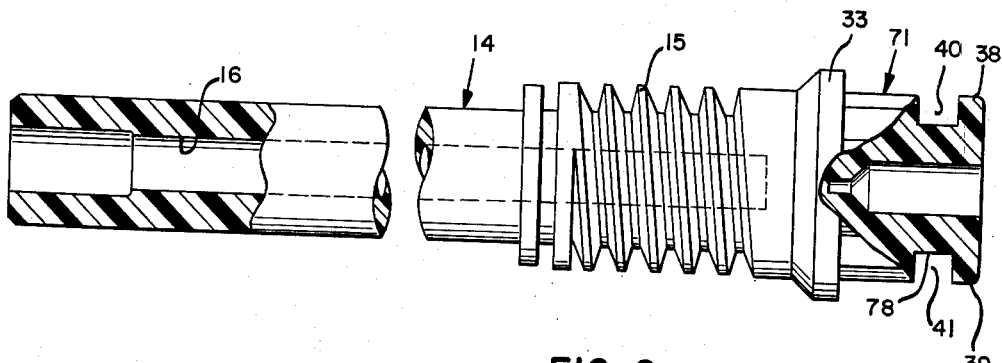
Figure 3:
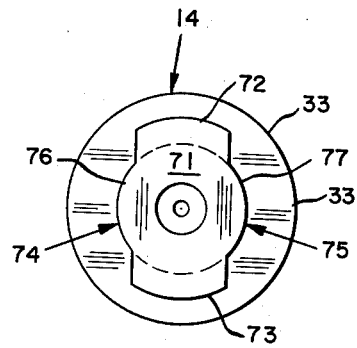
Figure 4:
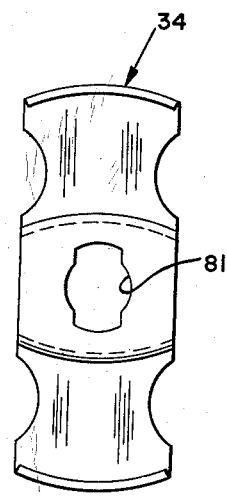
Figure 5:
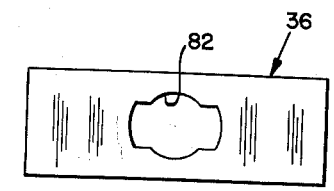
Figure 6:
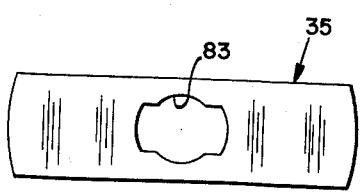
Figure 7:
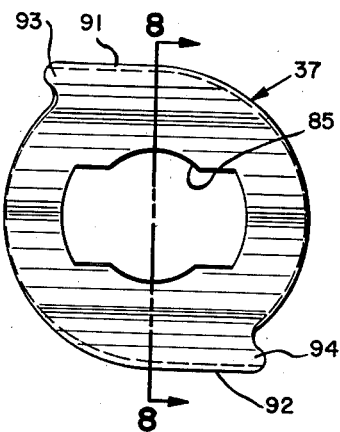
Figure 9:
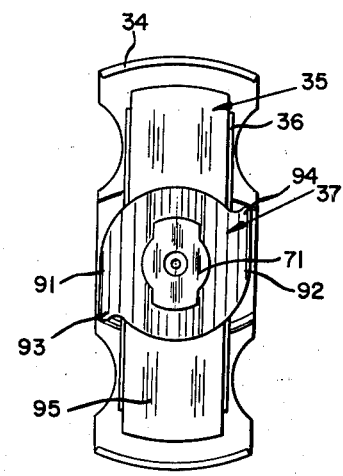
Figure 8:
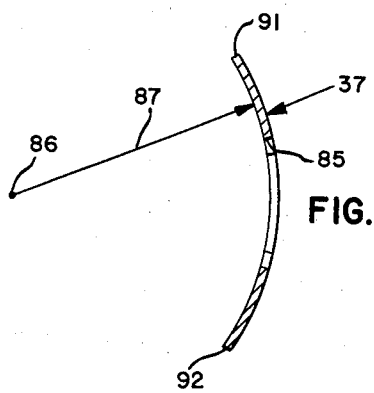
Figure 11:
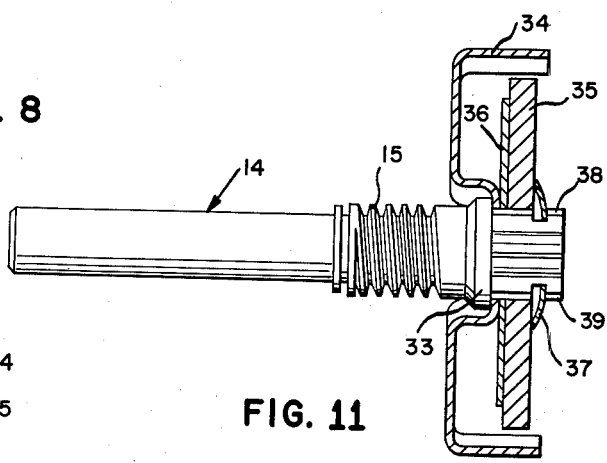
Figure 10:
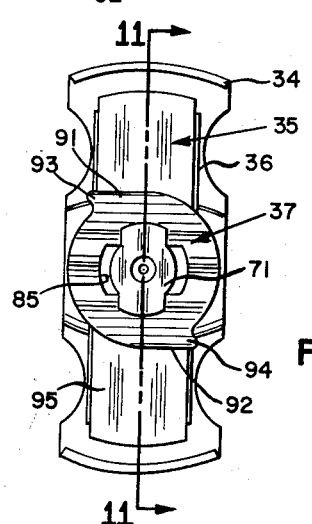

Other objects and attendant advantages of the invention will become more readily apparent as the specification is considered in connection with the attached drawings in which:

FIG. 1 is a cross sectional view through the speedometer of the present invention;
FIG. 2 is a side elevational view partially in section of the speedometer shaft of the present invention;
FIG. 3 is an end elevational view of the speedometer shaft shown in FIG. 2;
FIG. 4 is an elevational view of the flux collector used with the speedometer of the present invention;
FIG. 5 is an elevational view of the temperature compensator used with the magnet employed with the speedometer of the present invention;
FIG. 6 is an elevational view of the permanent magnet employed with the invention;
FIG. 7 is an elevational view of the spring washer employed to fasten the flux collector, permanent magnet, and temperature compensator to the speedometer shaft;
FIG. 8 is a sectional view taken along the lines 8—8 of FIG. 7;
FIG. 9 shows the spring washer placed over the end of the speedometer shaft in a loose relationship;
FIG. 10 is a view similar to FIG. 9 but with the spring washer rotated through 90° to fasten the permanent magnet, temperature compensator, and flux collector to the shaft; and
FIG. 11 is a sectional view taken along the lines 11—11 of FIG. 10.

Referring now to the drawings in which like reference numerals designate like parts throughout the several views thereof, there is shown in FIG. 1 a sectional view of the speedometer of the present invention in which the numeral 11 designates the speedometer housing. This speedometer housing contains an axial bore 12 having a sleeve bearing 13 mounted therein. A speedometer shaft 14 is mounted within this sleeve bearing and it includes a gear 15 formed in the medial portion thereof and a square hole 16 positioned in the end adjacent bearing 13. This speedometer shaft is preferably constructed of a nonmagnetic material having self-lubricating properties, for example, nylon which may be impregnated with a sulfide of molybdenum. This sulfide of molybdenum is preferably molybdenum disulfide. The gear 15 is adapted to engage another gear 17 that may be employed to drive the odometer (not shown) of the vehicle. The housing 11 also has a pair of threaded bores 18 and 19 positioned therein that serve as a means for mounting the speedometer in the vehicle.

A flexible cable having an inner driving member 21 and an outer sheath 22 is positioned against the end of the housing 11 so that the end of the driving shaft 21 which has a square portion is positioned within the square hole 16 in the speedometer shaft 14. A nut 23 having an inwardly extending flange 24 engaging an outwardly extending flange 25 on the outer sheath 22, is threadingly engaged with the housing as shown at 26. The driving member 21 is connected to a rotating part of the vehicle which rotates at a speed proportional to vehicle speed, for example, to a portion of the transmission gear (not shown). The driving member 21, therefore, rotates the shaft 14 at a speed proportional to vehicle speed.

The speedometer shaft 14 is positioned axially within the housing 11 by means of a washer 28 that is received within a groove 31 in the shaft and that is staked to the housing as shown at 32. The end portion of the shaft adjacent the gear 15 includes an enlarged annular shoulder 33, and as will be explained more fully in relation to FIGS. 2 through 11, a flux collector member, generally designated by the numeral 34, a permanent magnet, generally designated by the numeral 35, and a temperature compensator, generally designated by the numeral 36, are positioned over the end of the shaft so that the flux collector member engages the shoulder 33. A spring washer, generally designated by the numeral 37, engages the permanent magnet 35 and shoulders 38 and 39 on the shaft which are formed from transverse grooves 40 and 41 positioned in the end of the shaft.

An eddy current speed cup assembly, generally designated by the numeral 45, includes a cup having an axially extending flange 46 positioned between the ends of the permanent magnet 35 and the flux collector member 34 and a radially inwardly extending main body portion 47 connected to a hub 48. This hub 48 is affixed to a staff or shaft 50 which has one end 51 rotatably journaled within the speedometer shaft 14. For this purpose the speedometer shaft has an axially extending central bore 52 having a diameter larger than the diameter of the shaft 50 and a reduced bore 54 that receives end portion 51 of the shaft and more specifically reduced end portion 55. Thus, the end 51 of shaft 50 of eddy current speed cup assembly 45 is journaled within the speedometer shaft in direct contact with the self-lubricating material of the speedometer shaft. This eliminates the conventional jewel type bearing that is ordinarily employed in conventional speedometer arrangements and it substantially reduces the cost of the speedometer.

The other end of eddy current speed cup assembly shaft 50 is rotatably journaled within a bearing 61 that is threaded into a portion 62 of the housing 11. The end of the shaft 50 carries a pointer 63 that is positioned adjacent a speed scale, a portion of which is shown at 64. A hair spring 66 having one end affixed to hub 67 and the other to the housing member 62 as shown at 68, is employed to bias the pointer 63 toward the zero position on the speed scale.

As is well known to those skilled in the art, when the shaft 14 is rotated at a speed proportional to vehicle speed by the driving member 21, the relative rotation between the permanent magnet 35 and the eddy current speed cup assembly produces eddy currents within the cup. The magnetic field produced by these eddy currents reacts with the magnetic field of the permanent magnet to rotate the eddy current speed cup assembly and the pointer 63 relative to the speed scale 64 against the bias of the hair spring 66 an amount proportional to vehicle speed.

Referring now to FIGS. 2 and 3 of the drawings, the speedometer shaft 14 is shown in detail. The annular shoulder 33 is positioned near the end of the shaft and the remainder of the end of the shaft is reduced in dimension from the shoulder 33 and is generally oblong or rectangular in configuration, as can best be seen by reference to FIG. 3. This end portion is generally designated by the numeral 71 and it includes two opposed side portions 72 and 73 and two opposed longer side portions 74 and 75. The two longer opposed side portions have central protrusions 76 and 77 respectively which are preferably cylindrical sections. The grooves 40 and 41 are positioned across the shorter opposed side portions 72 and 73 in a direction substantially perpendicular to the axis of the shaft so that for a portion of the length of the shaft a short cylinder is formed in the end of the shaft as shown by the dotted lines in FIG. 3 and as indicated by the numeral 78 in FIG. 2.

The flux collector member, generally designated by the numeral 34 and shown in FIG. 4, has a central aperture 81 which conforms to the shape of the end portion 71 of the shaft. Similarly, the temperature compensator 36 shown in FIG. 5 and the permanent magnet 35 shown in FIG. 6 have central apertures 82 and 83 respectively which conform to the shape of end portion 71 of shaft 14. The flux collector, permanent magnet and temperature compensator, have been drawn to a smaller scale than the shaft shown in FIGS. 2 and 3, however, it is readily apparent that these three members are placed over the end of the shaft as shown in FIG. 1 so that the flux collector member engages the shoulder 33 on the shaft. These three members are nonrotatably fastened to the shaft by means of the spring washer shown in FIGS. 7 and 8.

The spring washer which is generally designated by the numeral 37 includes a central aperture 85 which conforms to the shape of the end portion 71 of the shaft 14 and to the apertures 81, 82 and 83 positioned in the flux collector member 34, temperature compensator 36, and permanent magnet 35, respectively. It is curved in a single direction so that the axis of curvature extends in a direction parallel to the longer opposed sides of the aperture 85. When the spring washer is mounted on the shaft this axis of curvature passes through the axis of the shaft in a direction perpendicular thereto. Thus, the spring washer 37 is a segment of a cylinder having a central axis of curvature as shown by the numeral 86 in FIG. 7 and a radius of curvature designated by the numeral 87. The axis of curvature extends in a direction parallel to the longer opposed sides of the aperture 85. The spring washer is positioned over the permanent magnet 35 and the end 71 of the speedometer shaft 14 after the flux collector 34, the temperature compensator 36 and the permanent magnet 35 have been positioned on the end of the shaft. This can best be seen by reference to FIG. 9 in which the aperture 85 in the spring washer 37 is aligned with the apertures in the flux collector member, temperature compensator and the permanent magnet. In this position the axis of curvature of the spring extends in a direction generally parallel to the longer opposed sides of oblong end portion 71 of shaft 14 and to the longer sides of magnet 35. The spring washer is so dimensioned with relation to the permanent magnet that the width of the spring washer, the dimension between the edges 91 and 92 is greater than the width of the magnet 35. Because of the curvature of the spring washer, as shown in FIG. 8, the edges 91 and 92 extend beyond the surface 95 of the permanent magnet toward the shoulder 33 of the shaft when the spring washer is positioned as shown in FIG. 9. This permits the shorter opposed end portions of the aperture 85 to lie adjacent the grooves 40 and 41 and inwardly of the shoulders 38 and 39 toward the shoulder 33. The spring washer has a pair of ears 93 and 94 for engaging a turning tool which is placed over the end of the shaft to turn the spring washer through 90° into the position shown in FIG. 10. As the washer is rotated the longer opposed edges of the aperture 85 remain within the groove and abut the shoulders 38 and 39 of the shaft as shown in FIG. 11. This prevents the center of the spring washer from moving axially and as it is turned so that the axis of curvature extends generally perpendicular to the opposed longer edges of oblong end portion 71 and the longer sides of magnet 35, the washer is compressed since the edge portions 91 and 92, which extended beyond the surface 95 of the magnet toward the shoulder 33, move toward the shoulders 38 and 39. These edge portions are positioned, therefore, in engagement with this surface of the magnet. Thus, the completed speedometer shaft assembly is shown in FIGS. 10 and 11 and it is then ready for mounting in the housing 11 as shown in FIG. 1.

This fastening means thus provides a novel and simple means for affixing a permanent magnet to a speedometer shaft, and it is particularly useful for employment with a permanent magnet that is constructed of powdered metal. In fact, this fastening means makes it possible to employ such powdered metal permanent magnets since they are quite brittle and cannot be staked to the shaft as is done with conventional magnets constructed of bar stock.

By providing the speedometer shaft constructed of a material having self-lubricating properties, the jewel type bearing ordinarily employed to journal the eddy cup shaft has been eliminated thereby eliminating a number of parts employed in conventional speedometers. This taken with the fact that the invention can employ powdered metal magnets substantially reduces the cost of the speedometer since powdered metal magnets can be produced in these sizes at less expense than permanent magnets constructed of bar stock.

Also, by affixing the speedometer shaft 14 axially within the housing 11 by means of the washer located closely adjacent the gearing and the end of the shaft that receives the eddy current cup shaft, the thermal growth problems that are inherent in this type of mechanism are substantially reduced over conventional mechanisms which ordinarily affix the speedometer shaft axially within the housing at the end of the shaft which receives the flexible cable. It can be appreciated that if the axial thermal growth of the speedometer shaft relative to the housing becomes excessive, the eddy current cup shaft 50 may tend to bind between the bearing 61 and the speedometer shaft 14. This, of course, would destroy the accuracy of the speedometer.

As was previously pointed out, the shaft 14 is preferably constructed of a nylon impregnated with molybdenum disulfide. The fact that this shaft is constructed of a non-magnetic material furnishes an advantage in that the shaft does not become magnetized and, therefore, cannot pick up metallic bits or chips that may interfere with the operation of the gear 15 as it drives another gear, for example, the gear 17, as shown in FIG. 1.

Thus, the present invention provides an automotive vehicle speedometer that is less expensive, less complicated and employs fewer parts than conventional speedometers. It also provides a novel fastening means for affixing a permanent magnet to the end of a speedometer shaft.

It will be understood that the invention is not to be limited to the exact construction shown and described, but that various changes and modifications may be made without departing from the spirit and scope of the invention as defined in the appended claims.

I claim:

1. In a speedometer mechanism for an automotive vehicle the combination comprising, a housing, a speedometer shaft rotatably mounted within said housing, said speedometer shaft being constructed of a nonmagnetic material having self-lubricating properties, a magnet affixed to said shaft, a flux collector also affixed to said shaft and having end portions spaced from the poles of said magnet, a staff rotatably journaled in said speedometer shaft in direct contact with the material having the self-lubricating properties, said staff having a speed cup affixed thereto, said speed cup including a portion positioned between the ends of said magnet and the flux collector, means engaging said staff and said housing for biasing said staff against the torque created by relative movement of said magnet and flux collector with respect to said speed cup, and an indicating means connected to the end of said staff for indicating speed.

2. In a speedometer mechanism for an automotive vehicle the combination comprising, a housing, a speedometer shaft rotatably mounted within said housing, said speedometer shaft being constructed of a nonmagnetic material impregnated with a sulfide of molybdenum, a magnet affixed to said shaft, a flux collector also affixed to said shaft and having end portions spaced from the poles of said magnet, a staff rotatably journaled in the speedometer shaft with the nonmagnetic material impregnated with a sulfide of molybdenum serving as a bearing material and directly engaging the staff, said staff having a speed cup affixed thereto, said speed cup including a portion positioned between the ends of said magnet and the flux collector, means engaging said staff and said housing for biasing said staff against the torque created by relative movement of said magnet and flux collector with respect to said speed cup, and an indicating means connected to the end of said staff for indicating speed.

3. In a speedometer mechanism for an automotive vehicle the combination comprising, a housing, a speedometer shaft rotatably mounted within said housing, said speedometer shaft being constructed of nylon impregnated with a sulfide of molybdenum, a magnet affixed to said speedometer shaft, a flux collector also affixed to said shaft and having end portions spaced from the poles of said magnet, a staff rotatably journaled in the speedometer shaft with the nylon impregnated with a sulfide of molybdenum serving as a bearing material and directly engaging the staff, said staff having a speed cup affixed thereto, said speed cup including a portion positioned between the ends of the magnet and the flux collector, means engaging said staff and said housing for biasing said staff against the torque created by relative movement of said magnet and flux collector with respect to said speed cup, and an indicating means connected to the end of said staff for indicating speed.

4. In a speedometer for an automotive vehicle, a speedometer shaft having an oblong end portion comprising a plurality of short edges and a plurality of long edges, said oblong end portion having a pair of grooves positioned across said short edges thereof in a transverse direction with respect to the longitudinal axis of said speedometer shaft, said grooves forming a pair of shoulders, a permanent magnet having an aperture positioned therein complemetary to the oblong end portion of the shaft and receiving the oblong end portion of the shaft, a spring washer having an oblong aperture comprising a plurality of long sides and a plurality of short sides positioned therein complementary to the oblong end portion of said shaft and adapted to slide over said oblong end portion of said shaft with the short sides and long sides of said washer parallel with the short and long edges respectively of said shaft, said short sides of said aperture being aligned with said grooves, said spring washer being curved about a radius of curvature extending substantially parallel to said long sides of the aperture, said spring washer adapted to be moved on said shaft so that the long sides of said aperture make a substantially perpendicular angle with the long edges of said oblong end portion of said shaft and the material of the spring washer positioned adjacent said long sides of said aperture being compressed between said permanent magnet and said shoulders whereby said permanent magnet is affixed to said speedometer shaft.

5. In a speedometer for an automotive vehicle the combination comprising, a speedometer shaft having an oblong end portion with a plurality of short edges and long edges, said short edges of said end portion each having a groove positioned therein extending in a transverse direction with respect to the longitudinal axis of said shaft, a rectangular magnet having an oblong aperture positioned therein, the oblong end portion of said shaft extending through the oblong aperture in said magnet sufficiently to expose said grooves, and a spring washer having an oblong aperture positioned therein with a plurality of short sides and a plurality of long sides, said spring washer adapted to slide over said oblong end portion of the shaft with the short sides and long sides of said washer parallel to the short edges and long edges respectively of said oblong end portion of said shaft, said short side of said aperture being aligned with said grooves, said spring washer being curved about an axis of curvature that extends parallel to said long sides of the oblong aperture, said spring washer and said magnet being so dimensioned that the edges of the spring washer adjacent said long sides of the aperture extend beyond the plane of the magnet when the spring washer is placed over the magnet in a position such that the oblong end portion of said shaft extends through the oblong aperture in said spring washer and said spring washer is aligned with said grooves, said spring washer adapted to rotate through an angle so that the long sides of said aperture make an angle with said short sides and the material of the spring washer adjacent said long sides of said aperture is compressed between the magnet and the walls of the grooves in the oblong end portion of said shaft.

References Cited in the file of this patent

UNITED STATES PATENTS

| | | |
|---|---|---|
| 1,980,019 | Wallis | Nov. 6, 1934 |
| 2,674,447 | Sivacek | Apr. 6, 1954 |

FOREIGN PATENTS

| | | |
|---|---|---|
| 772,211 | Great Britain | Apr. 10, 1957 |
| 561,088 | Belgium | Oct. 15, 1957 |
| 857,785 | Great Britain | Jan. 4, 1961 |

OTHER REFERENCES

An article from "Machine Design," March 1954, pp. 153–159, "Designing Fabricated Nylon Parts," by R. B. Zimmerli.

An article from "Scientific Lubrication," April 1959, pp. 32–35, entitled "Molybdenum Disulfide," by C. J. C. Vineall.

An article from "Molybdenum Disulfide as a Lubricant," a publication of Climax Molybdenum Company, page 50, reprinted from Research, vol. 3, Number 8, August 1950, entitled "Frictional Behavior of Plastics Impregnated with Molybdenum Disulphide," by Bowden et al.